(12) United States Patent  (10) Patent No.: US 8,505,795 B2
Dunn  (45) Date of Patent: Aug. 13, 2013

(54) CD MOUNTING APPARATUS FOR PORTABLE ELECTRONIC DEVICE

(76) Inventor: Chance Dunn, Livermore, CA (US)

( * ) Notice: Subject to any disclaimer, the term of this patent is extended or adjusted under 35 U.S.C. 154(b) by 1458 days.

(21) Appl. No.: 11/445,120

(22) Filed: May 31, 2006

(65) Prior Publication Data

US 2007/0278274 A1  Dec. 6, 2007

(51) Int. Cl.
  *B60R 7/00*  (2006.01)
(52) U.S. Cl.
  USPC .................... 224/556; 224/545; 224/567
(58) Field of Classification Search
  USPC ............ 224/483, 554, 550, 556, 558, 555, 224/929; 248/27.1, 27.3, 224.8, 225.11, 248/231.9, 291.1; 269/3, 6, 71, 76
  See application file for complete search history.

(56) References Cited

U.S. PATENT DOCUMENTS

| | | | | |
|---|---|---|---|---|
| 1,688,765 A * | 10/1928 | Veras | ........................... | 248/103 |
| 1,908,470 A * | 5/1933 | Beuttner | .................. | 248/229.15 |
| 2,598,670 A * | 6/1952 | Bentley et al. | ............... | 220/86.2 |
| 3,056,412 A * | 10/1962 | Wolfe | ........................... | 131/328 |
| 3,071,338 A * | 1/1963 | Kaufman et al. | ............. | 248/539 |
| 3,964,612 A * | 6/1976 | Skilliter et al. | ................. | 211/26 |
| 4,186,903 A * | 2/1980 | Fazakerley | ..................... | 248/210 |
| 4,194,338 A * | 3/1980 | Trafton | ......................... | 403/305 |
| 4,256,281 A * | 3/1981 | Harris et al. | ............... | 248/230.9 |
| 4,320,892 A * | 3/1982 | Longbrake | ......................... | 36/31 |
| 4,535,923 A * | 8/1985 | Manke | ........................... | 224/550 |
| 4,714,239 A * | 12/1987 | LeVine | .............................. | 269/3 |
| 4,776,553 A * | 10/1988 | Kobayashi | ..................... | 248/558 |
| 4,858,990 A * | 8/1989 | Combs-Rose et al. | ... | 297/184.15 |
| 4,887,753 A * | 12/1989 | Allen | .............................. | 224/312 |
| 4,887,784 A * | 12/1989 | Kayali | ........................ | 248/311.2 |
| 4,997,156 A * | 3/1991 | Allen | ........................... | 248/311.2 |
| 5,014,956 A * | 5/1991 | Kayali | ........................ | 248/311.2 |
| 5,016,845 A * | 5/1991 | Pellegrino | ..................... | 248/104 |
| 5,018,374 A * | 5/1991 | Montano | ......................... | 70/233 |
| 5,033,528 A * | 7/1991 | Volcani | ......................... | 160/351 |
| 5,044,577 A * | 9/1991 | Spearman | ..................... | 224/544 |
| 5,056,822 A * | 10/1991 | Shim | ............................... | 281/44 |
| 5,086,958 A * | 2/1992 | Nagy | ............................ | 224/544 |
| 5,109,411 A * | 4/1992 | O'Connell | ..................... | 379/454 |
| 5,135,189 A * | 8/1992 | Ghazizadeh | .................. | 248/104 |
| 5,138,801 A * | 8/1992 | Anthon et al. | ................. | 451/540 |
| 5,179,590 A * | 1/1993 | Wang | ............................ | 379/454 |
| 5,187,744 A * | 2/1993 | Richter | ......................... | 379/449 |
| 5,285,938 A * | 2/1994 | Fauchald | ....................... | 224/482 |
| 5,392,350 A * | 2/1995 | Swanson | ....................... | 379/446 |
| 5,489,055 A * | 2/1996 | Levy | ............................ | 224/544 |
| 5,489,075 A * | 2/1996 | Ible | ............................... | 248/104 |
| 5,529,271 A * | 6/1996 | Dunchock | .................. | 248/205.2 |
| 5,593,124 A * | 1/1997 | Wang | ........................ | 248/231.81 |
| 5,673,628 A * | 10/1997 | Boos | ............................... | 108/44 |
| 5,813,583 A * | 9/1998 | Benedeti | ....................... | 224/483 |
| 5,853,158 A * | 12/1998 | Riggle | ........................ | 248/311.2 |
| 5,961,083 A * | 10/1999 | Hartmann et al. | ........ | 248/222.14 |
| 5,979,724 A * | 11/1999 | Loewenthal et al. | ......... | 224/483 |
| 5,996,957 A * | 12/1999 | Kurtz | ........................... | 248/311.2 |
| 6,138,969 A * | 10/2000 | Olausson | ................. | 248/222.52 |
| 6,227,511 B1 * | 5/2001 | De Costa | .................. | 248/311.2 |

(Continued)

*Primary Examiner* — Nathan J Newhouse
*Assistant Examiner* — Peter Helvey
(74) *Attorney, Agent, or Firm* — Schmeiser, Olsen & Watts, LLP; Michael W. Starkweather (57) ABSTRACT

A mounting apparatus for portable electronic devices (hereinafter "PED"). More particularly, the present invention relates to a mounting bracket and PED holder that allows the user to use and store their PED in a compact disk ("CD") player of a motor vehicle.

2 Claims, 5 Drawing Sheets

(56) References Cited

U.S. PATENT DOCUMENTS

| | | | |
|---|---|---|---|
| 6,317,497 B1* | 11/2001 | Ou | 379/454 |
| 6,322,028 B1* | 11/2001 | Fleckenstein | 248/210 |
| 6,357,710 B1* | 3/2002 | Fielden et al. | 248/276.1 |
| 6,560,983 B1* | 5/2003 | Schimmeyer | 62/244 |
| 6,779,765 B2* | 8/2004 | Zheng et al. | 248/206.3 |
| 6,832,745 B2* | 12/2004 | Lindsay | 248/311.2 |
| 6,896,231 B1* | 5/2005 | Sullivan, Sr. | 248/311.2 |
| 6,929,229 B1* | 8/2005 | Palmby | 248/311.2 |
| 7,090,183 B2* | 8/2006 | Heybl et al. | 248/314 |
| 7,403,613 B2* | 7/2008 | Liou | 379/455 |
| 2008/0173567 A1* | 7/2008 | Magee | 206/562 |
| 2008/0190978 A1* | 8/2008 | Brassard | 224/483 |

\* cited by examiner

CD MOUNTING APPARATUS FOR PORTABLE ELECTRONIC DEVICE

BACKGROUND OF THE INVENTION

A. Field of the Invention

The invention disclosed herein relates generally to a mounting apparatus for portable electronic devices (hereinafter "PED"). More particularly, the present invention relates to a mounting bracket and PED holder that allows the user to use and store their PED, particularly in a compact disk ("CD") player of a motor vehicle.

B. Description of the Prior Art

There exists several mounting devices for automobile electronics. For example, Benedeti invention U.S. Pat. No. 5,813, 583 provides a portable CD holder that can be screwed into the underside of the dashboard. This requires that the dashboard of the vehicle be permanently altered, along with the associated risks and expenses. The Sokol invention, U.S. Pat. No. 4,648,572, utilizes a suction cup device intended to attach to the front windshield of the vehicle to support a radar detector device. Such a device has limitations including negative aesthetic characteristics, limiting the view of the driver, and eventual loss of adhesion to the surface of the windshield.

Also, the pending application (application Ser. No. 11/387, 576) of this applicant (Chance Dunn) discloses a bracket and PED holder that attaches to an audio cassette. While this invention is novel and useful, as fewer automobiles are being equipped with audio cassette players, a device that holds a PED in an automobile CD player is needed.

SUMMARY OF THE INVENTION

Portable electronic devices (PEDs) include, but are not limited to, the following devices: mp3 players, Ipods, cell phones, satellite radios, PDAs, or other digital audio sources. Given the rapid advance of portable audio technology that now includes the use of digital audio sources, many people access music via the PED in addition to, or instead of, a CD player. However, most automobiles have CD players in the dashboard.

As discussed above, mounting a mobile device inside an automobile is usually inconvenient. The limited space of the automobile is already utilized by the car stereo and other in-dash items that make the mounting of additional devices inconvenient. The invention described herein allows for the mounting of any appropriately sized electronic device in a convenient place to reach without obstructing the driver's viewing area.

The present invention includes a bracket that is attached to a mounting apparatus capable of insertion into the opening of a CD player. The portion of the device capable of insertion into the opening of the CD player may include a wedge shaped member. This wedge shaped member is designed to be inserted into, and remain in, the opening of the CD player during use. This wedge shaped member allows the top and bottom edges of the wedge to put pressure on the opening of the CD player, thus causing the device to fit securely therein. An embodiment of the wedge member includes an arc shaped cutout on the front end of the wedge. In some dashboard configurations, this cutout feature on the wedge may improve the usability of the CD player while the mounting apparatus is installed.

Alternatively, the portion of the device capable of insertion into the opening of the CD player may comprise two substantially parallel plates capable of separation. The plates may be separated through the use of one or more screws (or similar mechanism) in contact with the two plates. The plurality of screws may include a knob, wings, or similar device for ease of use. Similar to the wedge shape embodiment, the parallel plates may include an arc shaped cutout on the front end of the leading edge. Further, as in the wedge shape embodiment, the parallel plate embodiment allows the user to insert the device into the opening of the CD player, then put pressure from the top and bottom edges of the plates onto the opening of the CD player, thus causing the device to fit securely therein.

A variety of configurations can create pressure on the edges of the wedge, including a mechanical means and/or memory foam. The mechanical means of securing the device into the CD player opening can be manual and/or automatic. In one embodiment, one or more adjustable screws located in or about the wedge or parallel plate portion can increase the separation of the plates, and thus increases the pressure against the CD player opening. Mechanical means can also include a spring mechanism that puts pressure on the CD player opening. Such a spring or spring-type mechanism may have the advantage of having the capability of securing itself automatically when placed into the CD player opening.

Another configuration includes visco-elastic material, commonly referred to as memory foam, within the wedge. This memory foam, if located between the edges of the wedge, would allow the user to press the wedge into the opening, thus squeezing the edges together. The memory foam would then put outward pressure on the edges of the wedge, thus helping to secure the device.

The bracket and mounting apparatus may be configured in one piece, or multiple attached pieces. The bracket portion is shaped and configured such that a CD can remain in the vehicle's CD player during use, while the bracket projects outward from the CD player. Another embodiment allows the bracket portion to retract so as to minimize the portion extending away from the CD player.

Some dashboard configurations would not allow for the convenient placement of this invention while the PED is placed above the plane of the wedge/bridge portion of the device. For example, a configuration where the top of the dashboard slopes forward (towards the passenger compartment) may interfere with the placement of the PED and PED holder. As such, another embodiment of this invention allows the device to be inverted. The parallel or wedge shaped plates portion will secure the device into the CD player opening equally well in the inverted position. Still another configuration allows the parallel plates or wedge to remain secured in the CD player opening while the PED holder member pivots or rotates into either the above plane (or below plane) configuration.

The present invention includes a bracket that is attached to the wedge or parallel plate shaped member. The bracket is shaped and configured such that the device may remain attached to the vehicle's CD player during use, while the bracket projects outward from the CD player. At the other end of the bracket is a means to hold a PED. In one embodiment, the means to hold the PED comprises a clip or basket or similar arrangement that holds the PED during use. Another embodiment comprises a relatively flat surface of the bracket portion facing the driver that can include a Velcro or similar substance. Using this configuration, Velcro can then be placed on the back of the PED. These configurations will allow the user to easily secure the PED to the device. The above described device and configuration allows the user to easily, safely, and conveniently access their PED while in their automobile.

DETAILED DESCRIPTION OF THE DRAWINGS

Figure 1:
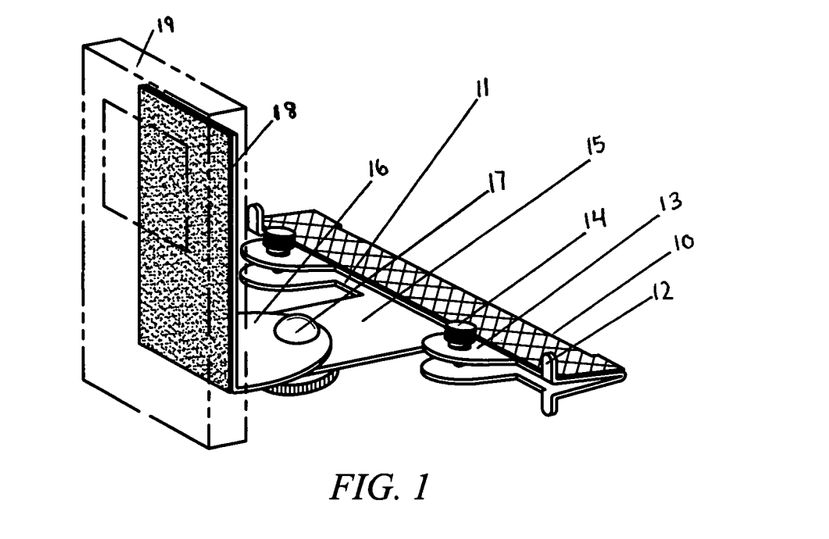
FIG. 1 is a perspective view of an embodiment of the invention.

FIG. 1 is a perspective view of an embodiment of the invention. The wedge shaped CD player insert is shown, as well as the attached stoppers 12 on the ends of the wedge. These stoppers act as a guide when placing the device into the CD player opening and limit how far the wedge portion can be inserted into the CD player opening. As the top and bottom portions of the wedge are separated, the angle of the wedge becomes steeper. If this separation takes place while the wedge is inserted into the CD player opening, additional pressure will be placed by the wedge into the opening, which will aid in securing the device during use. Wedge flaps 13 are shown at the rear end of the wedge member. The wedge flaps 13 can be attached to, or made part of, the wedge member. The top and bottom flaps can be separated from each other via a variety of means, including but not limited to, screws, springs, memory foam, etc. In FIG. 1 the wedge is separated by a wedge flap screw 14 in each of the wedge flaps 13. A bracket 15 (or bridge) member projects from the lower wedge 11. However, certain embodiments allow some or all of the device to be rotated such that the PED is located substantially below the plane of the protruding bracket.

FIG. 1 illustrates an embodiment where the CD player insert is attached to a bridge or bracket 15 that extends out from the lower wedge portion of the insert 11, such that the bracket 15 extends out from the insert when the insert 11 is placed in the CD player of the automobile. The bracket 15 may be made from a variety of different materials, including but not limited to metal and/or plastic. In one embodiment, the bracket 15 is rigid, while in other embodiments, the bracket 15 is flexible. The bracket 15 can be affixed to the insert in a variety of ways, including the use of adhesive, or a mechanical attachment, such as with a physical coupling the insert and bracket. The bracket 15 can also be integrated into the insert such that it comprises an extension of the CD insert, and can be made from the same material as the CD insert. The bracket 15 is configured such as to allow it to extend from the CD insert while it is engaged in the opening of the CD player.

A mounting apparatus 16 is shown attached to the bracket 15 via a connecting bracket screw 17. This arrangement allows the mounting apparatus 16 (and PED when mounted) to swivel to a convenient position.

FIG. 1 also shows a holding plate 18 attached to the end of the mounting apparatus 16. In one embodiment, this holding plate 18 can comprise a relatively flat rigid surface with a Velcro (or the like) surface facing outward from the CD player. If the user places Velcro or the like on the back of their PED 19, this configuration would allow the user to easily affix their PED 19 onto the holding plate 18, as well as easily remove it. In other configurations, such as in FIG. 5, the user can place the PED 19 within a clip apparatus, located at the end of the mounting apparatus 16, that supports the PED 19 from both sides and the bottom. In a preferred embodiment, the clip apparatus will allow the PED 19 to remain open and unfettered on top, which will allow the user to easily access the headphone jack of the PED 19, which is typically located on top of the PED 19.

Figure 2:
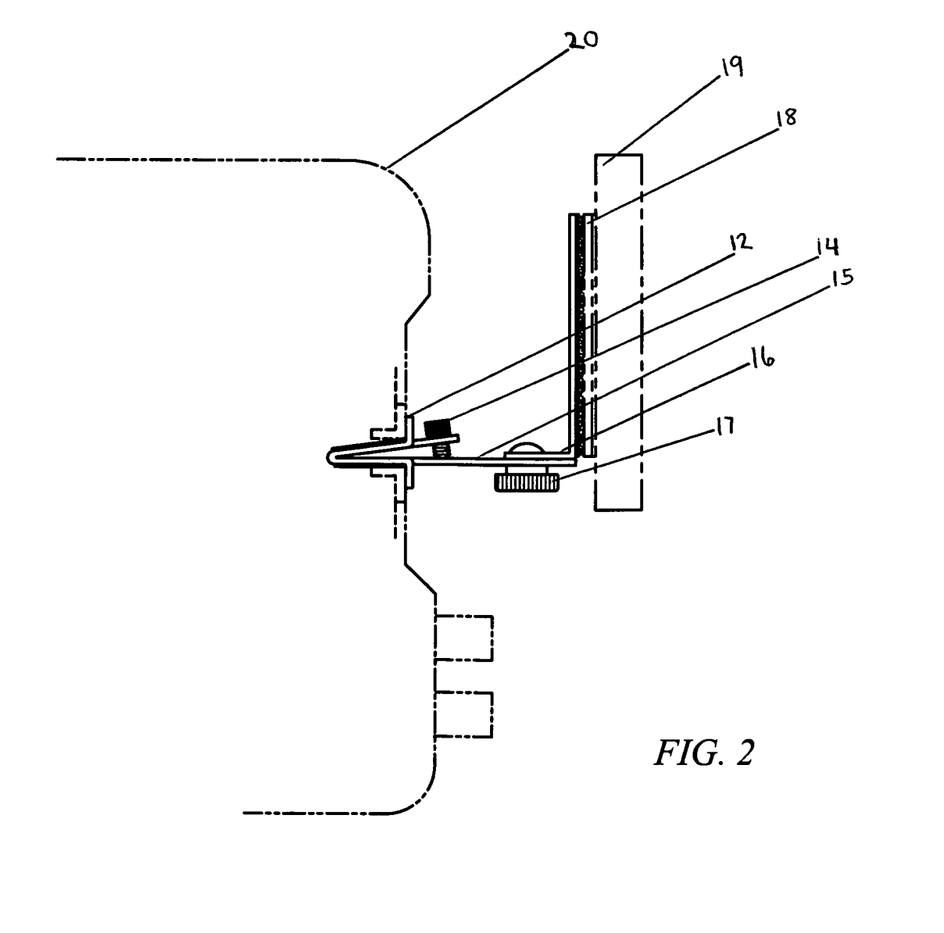
FIG. 2 is a cross-section side view of an embodiment of the invention.

FIG. 2 is a cross-section side view of an embodiment of the invention. It shows an embodiment of the invention installed in the dashboard 20 of a vehicle. After insertion of the wedge portion into the opening of the CD player, the stoppers 12 abut the exterior surface of the CD player. These stoppers 12 control the depth of the wedge portion into the CD player. When the wedge flap screw 14 is engaged, this separates the wedge and puts pressure on the interior of the CD player opening, thus firmly holding the device in place.

FIG. 2 also illustrates the bracket screw 17, which connects the bracket 15 and the mounting apparatus 16. This connection also allows the mounting apparatus 16 to rotate to into a position suitable to the user. As in FIG. 1, the holding plate 18 is attached to the end of the mounting apparatus 16. In this embodiment, the holding plate 18 can comprise a relatively flat rigid surface with a Velcro (or the like) surface facing-outward from the CD player. A Velcro or similar type material is shown on the forward facing portion of the holding plate 18. The figure shows a similarly sized strip of Velcro or similar type material on the back of the PED 19. This configuration allows the user to simply press the PED 19 against the holding plate to secure it. In this embodiment, the CD player is located in the dashboard of an automobile. After the PED 19 has been secured to the apparatus in this fashion, the PED 19 will be can be easily accessed by a user located in the front seat of the automobile.

Figure 3:
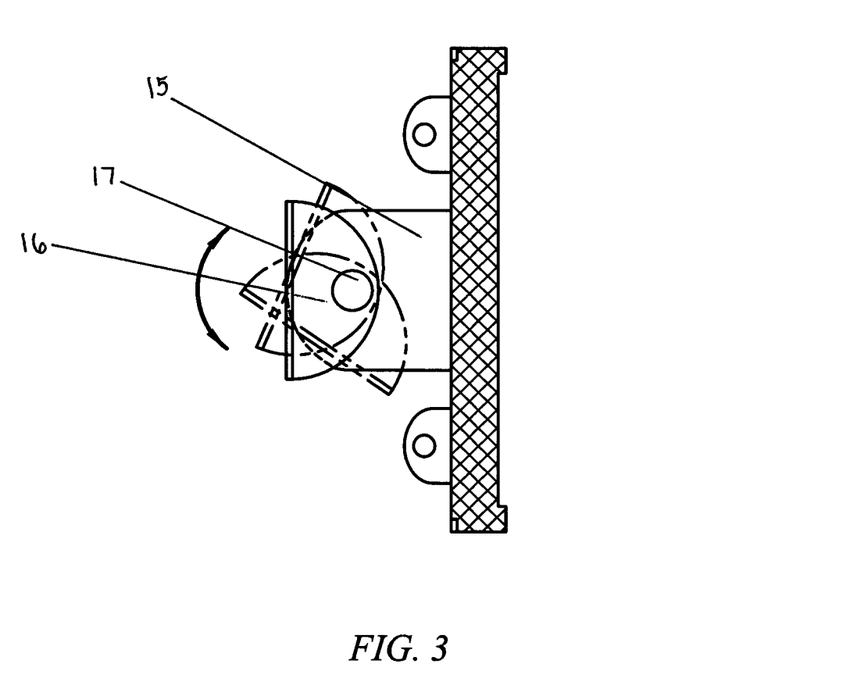
FIG. 3 is a top-down view of a portion of an embodiment of the invention.

FIG. 3 is a top-down view of a portion of an embodiment of the invention. This drawing illustrates a feature of certain embodiments that allow the device to rotate about the bracket screw 17. By loosening the bracket screw 17, the mounting apparatus 16 (along with the PED) can be swiveled into the desired position. When the mounting apparatus 16 is in the desired position, the bracket screw 17 can be tightened to lock the mounting apparatus 16 in place. During this process, the bracket 15 remains stationary.

Figure 4:
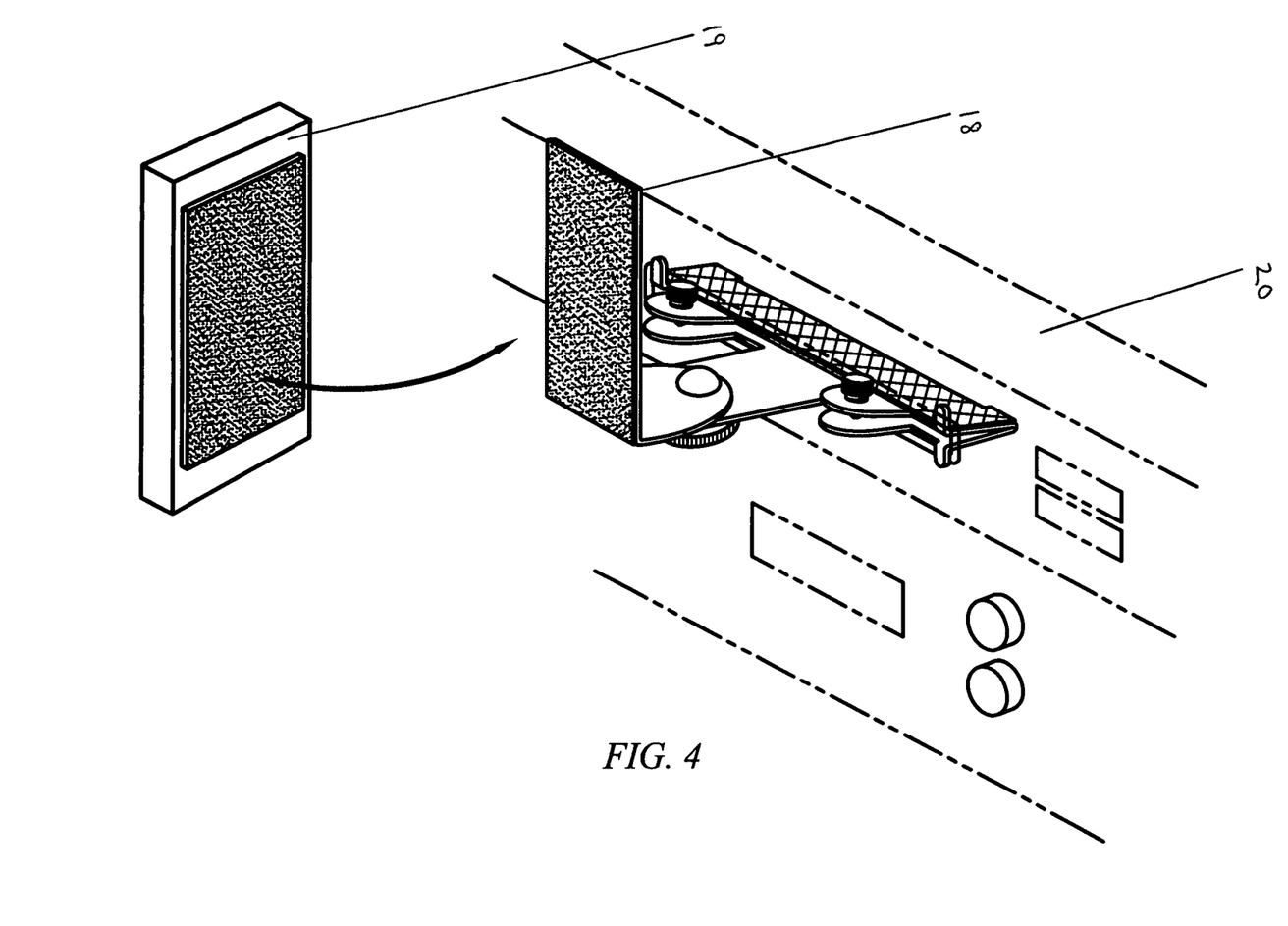
FIG. 4 is a perspective view of an embodiment of the invention installed in the opening of a dash mounted CD player.

FIG. 4 is a perspective view of an embodiment of the invention installed in the opening of a dash mounted CD player. This figure illustrates an embodiment utilizing the holding plate 18 at the end of the bracket 16. The PED 19 has not yet been affixed to the holding plate 18. A Velcro or similar type material is shown on the forward facing portion of the holding plate 18. The figure shows a similarly sized strip of Velcro or similar type material on the back of the PED 19. This configuration allows the user to simply press the PED 19 against the holding plate to secure it. In this embodiment, the CD player is located in the dashboard of an automobile. After the PED 19 has been secured to the apparatus in this fashion, the PED 19 can be easily accessed by a user located in the front seat of the automobile.

Figure 5:
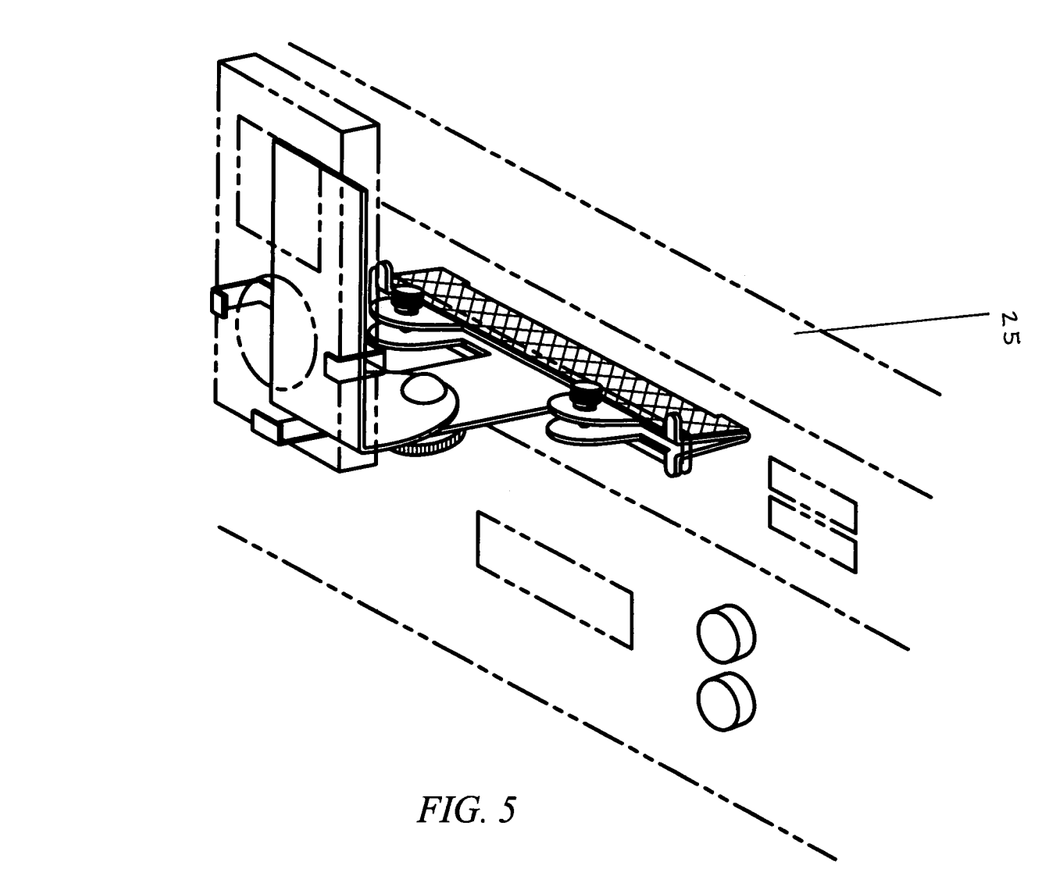
FIG. 5 is a perspective view of an embodiment of the invention installed in the opening of a dash mounted CD player.

FIG. 5 illustrates an embodiment utilizing a clip 21 (or basket) arrangement for holding the PED 19. In the embodiment shown, clips 21 extend from the two sides and the bottom of the holding plate 18, on the side of the holding plate farthest from the CD player. In the configuration shown, the ends of the clips 21 located on the sides of the holding plate are angled at approximately 90 degrees from the portion of the clip extending from the holding plate, this bend in the clip angling towards the middle of the holding plate 17. Similarly, the clip 21 supporting the bottom of the PED 19 is angled up at the end. These bends in the clips 21 assist in securing the PED 19 when placed within the confines of the apparatus.

Alternative embodiments include a basket arrangement on the end of the bracket 15 capable of supporting and securing a PED 19. Such an embodiment is preferably open on top to facilitate easy placement and removal of the PED 19, as well as facilitate easy plugging in and unplugging of the PED 19 headphones.

Figure 6:
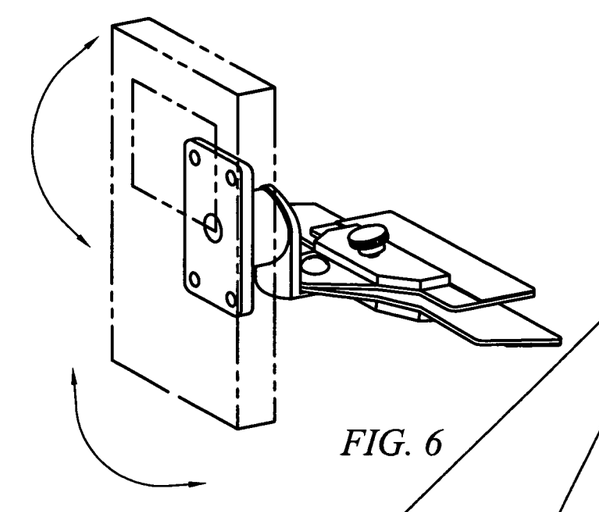
FIG. 6 is a perspective view of an embodiment of the invention.
Figure 7:
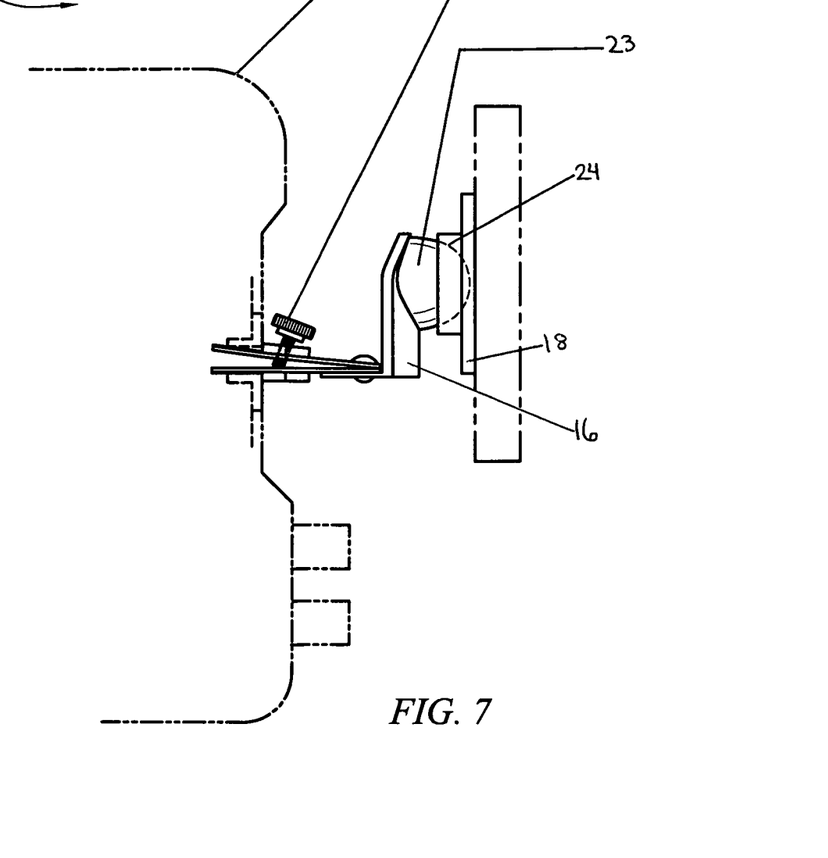
FIG. 7 is a cross-section side view of an embodiment of the invention.

FIGS. 6 and 7 are perspective views of an embodiment of the invention. These illustrations shows a configuration that utilizes one separation screw 22 with a knob located above the top wedge, with the screw penetrating the top portion of the wedge and abutting the lower wedge portion. As the screw 22 is tightened, the wedge portions are separated, thus securing the device by creating pressure between the wedge and the opening to the CD player.

Also shown in FIGS. 6 and 7 is an embodiment utilizing a ball 23 and socket joint 24. The ball 23 is shown attached to the mounting apparatus 16 and the socket joint 24. The socket joint 24 may be permanently attached to the holding plate 18, or basket, or clip arrangement. It is intended that the connection between the ball 23 and the mounting apparatus 16 be fixed and stationary, while the connection between the ball 23 and the socket joint 24 can be accomplished through the use of a screw, or other similar mechanism. Similarly, a clip 21 (or basket) device can easily be substituted for the holding plate 18 shown in FIGS. 6 and 7. In a preferred embodiment, the ball 23 remains stationary relative to the mounting apparatus 16, while the socket joint is allowed to swivel relative to the ball 23. This will allow the user to adjust the vertical and/or horizontal angle of the PED 19 when attached to the apparatus.

This embodiment also allows the user to remove and rotate the device 180 degrees, and re-insert the device into the CD player opening. This may be a preferred embodiment if the user's dashboard 20 is shaped in a way that interferes with the use of the apparatus when in the upright position shown in FIGS. 6 and 7.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

What is claimed:

1. 1 An electronic device holder, designed to be mounted to a CD player slot in a vehicle, comprising:
    a) a mounter, having a generally horizontal orientation while in operation of being mounted in the CD player slot, and designed to securely mount the electronic device holder to the CD player slot, having:
        i. a first insert, having a flat upward and bottomward facing surface as oriented when placed into the CD player slot, and having a first insert edge that is first inserted into the CD player, and an attachment end that is opposite to the first insert edge, the first insert forming a first insert plane extending along the upward and bottomward facing surface;
        ii. a second insert, having a flat upward and bottomward facing surface as oriented when placed into the CD player slot, and having a second insert edge that is inserted into the CD player, and an attachment end that is opposite to the second insert edge, the second insert is sized to have a portion fit within the CD player slot, wherein only the second insert bottomward facing surface and first insert upward facing surface contact the CD player slot when placed in the CD player slot, the second insert forming a second insert plane along the upward and bottomward facing surface; and
        iii. an adjustment mechanism, having:
            a) retainer, fixedly coupled to the first and second attachment end, having a linear width larger than the thickness and depth, wherein the thickness forms the thickness of a retainer plain extending along the linear width and depth that is substantially complainer with the first and second attachment end;
            b) a first position that retains the first and second attachment end in the retainer plain in a fixed unmoving position relative to each other, and placing the first and second insert plain relatively parallel to the retainer plain;
            c) a second position that retains the first and second attachment end in the retainer plain in a fixed unmoving position relative to each other, and simultaneously retaining a retaining angle between the first and second insert plain; and
            d) an adjuster, adjustably coupled to first insert, having a threaded outside surface, whereby turning of the adjuster causes the first insert plane to move away from the second insert plane and forming the retaining angle between the first and second insert plane;
    b) a holder, rotatively attached to the mounter, and having a top surface facing that is incapable of facing the mounter and substantially forms a top surface plane, the top surface plane of being oriented parallel to the retainer plane and the first and second insert plane, and incapable of being oriented facing the mounter; and
    c) a securing mechanism, mounted to the top surface of the holder, designed to retain the electronic device to the holder in a generally vertical orientation to the retainer plane.

2. An electronic device holder, designed to be mounted in a vehicle, comprising:
    a) a mounter, having a generally horizontal orientation while in operation of being mounted in the CD player slot, having:
        i. a first insert, having a flat upward and bottomward facing surface as oriented when placed into the CD player slot, and having a first insert edge that is inserted into the CD player, and an attachment end that is opposite to the first insert edge, the first insert forming a first insert plane extending along the upward and bottomward facing surface;
        ii. a second insert, having a flat upward and bottomward facing surface as oriented when placed into the CD player slot, and having a second insert edge that is inserted into the CD player, and an attachment end that is opposite to the second insert edge, wherein the second bottomward facing surface and first plate upward facing surface contact the CD player slot when placed in the CD player slot, the second insert forming a second insert plane extending along the upward and bottomward facing surface; and
        iii. an adjustment mechanism, having:
            a) a first position that retains the first and second attachment end in a fixed unmoving position relative to each other, and placing the first and second insert plain relatively parallel to each other;
            b) a second position that retains the first and second attachment end in the retainer plain in a fixed unmoving position relative to each other, and simultaneously retaining a retaining angle between the first and second insert plain; and c) an adjuster, adjustably coupled to first insert, having a threaded outside surface, whereby turning of the adjuster causes the first insert plane to move away from the second insert plane and forming the retaining angle between the first and second insert plane;

b) a holder, rotatively attached to the mounter, and having a top surface that is incapable of facing toward the mounter; and c) a securing mechanism, mounted to the top surface of the holder, designed to retain the electronic device to the coupler holder in a generally vertical orientation to the retainer plane.

* * * * *

UNITED STATES PATENT AND TRADEMARK OFFICE
CERTIFICATE OF CORRECTION

| | | |
|---|---|---|
| PATENT NO. | : 8,505,795 B2 | Page 1 of 1 |
| APPLICATION NO. | : 11/445120 | |
| DATED | : August 13, 2013 | |
| INVENTOR(S) | : Chance Dunn | |

It is certified that error appears in the above-identified patent and that said Letters Patent is hereby corrected as shown below:

In the Claims

Col. 6, Claim 1, line 5 should read: -- a) a retainer, fixedly coupled to the first and second attachment end,... --

Col. 6, Claim 1, line 31 should read: -- ...top surface plane incapable of being oriented... --

Signed and Sealed this
First Day of October, 2013

Teresa Stanek Rea
*Deputy Director of the United States Patent and Trademark Office*